Sept. 13, 1966  K. J. WHITE  3,272,067
COPYING APPARATUS
Filed Jan. 31, 1964

INVENTOR.
Kenneth John White
BY
Roberts Cushman & Grover
ATT'YS

United States Patent Office 3,272,067
Patented Sept. 13, 1966

3,272,067
COPYING APPARATUS
Kenneth John White, Framingham, Mass., assignor to Dennison Manufacturing Company, Framingham, Mass., a corporation of Nevada
Filed Jan. 31, 1964, Ser. No. 341,616
1 Claim. (Cl. 88—24)

This invention relates to apparatus for reproducing a record and particularly to apparatus for forming an electrostatic image on photoconductive paper or the like by projection printing such as described and claimed in the copending application of Richard E. Rice, Ser. No. 263,939, filed March 8, 1963.

Objects of the invention are to provide copying apparatus which is simple and economical to produce, which is compact, which reproduces a record uniformly throughout its entire area, which corrects for lenses having deficient coverage, which is easily and quickly adjustable for light sources of different intensities, and which is quickly and easily adjustable.

This invention involves a printer comprising a chamber having a record window to receive a record sheet, a print window to receive a sheet of photographic material, a lens between the two windows to focus the record sheet on the photographic sheet, said chamber and windows having corresponding rectangular shapes, means for illuminating the record sheet including light sources in said chamber opposite the record window, a reflector behind each light source, each reflector being directed toward an opposite side of said chamber adjacent the record window, sides of said chamber being reflective, a baffle in front of each light source to shield an area including said light window, and means to adjust the baffles to vary said areas. Preferably each baffle comprises superposed parts and means to adjust one part relatively to the other part so that it projects more or less beyond an edge of the other part. In the preferred embodiment the adjustable part is polygonal and is eccentrically mounted on the other part so that, in different angular positions, different edges project different distances beyond said edge of the other part.

For the purpose of illustration a typical embodiment of the invention is shown in the accompanying drawing in which—

Figure 1:
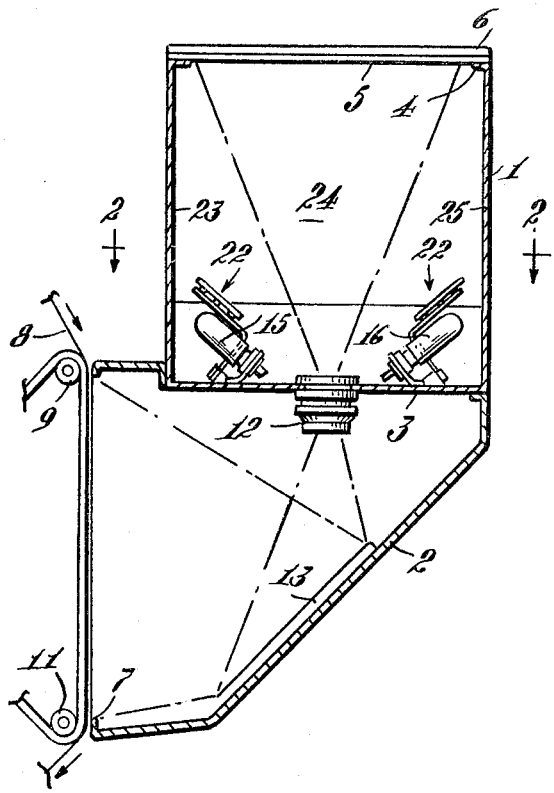
Figure 2:
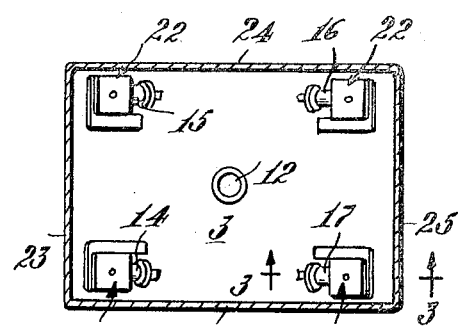
Figure 3:
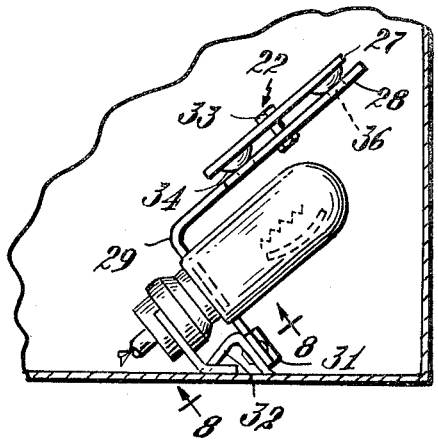
Figure 4:
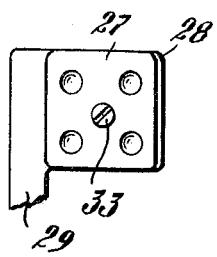
Figure 5:
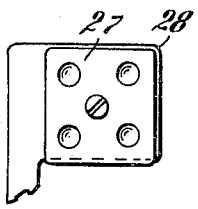
Figure 6:
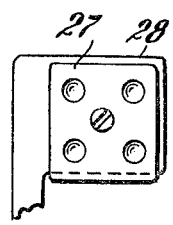
Figure 7:
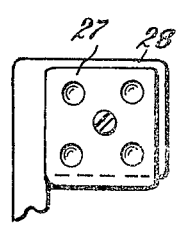
Figure 8:
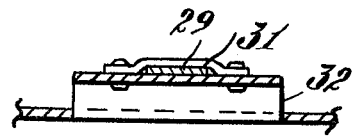

FIG. 1 is a vertical section of the apparatus;
FIG. 2 is a section on line 2—2 of FIG. 1;
FIG. 3 is an enlarged side view of one of the lamp assemblies;
FIGS. 4 to 7 are front views of one of the baffles in each of four different adjusted positions; and
FIG. 8 is a section on line 8—8 of FIG. 3.

The particular embodiment of the invention chosen for the purpose of illustration comprises a casing having two chambers 1 and 2 with a partition 3 therebetween. In the top of chamber 1 is a record window 4 covered by a transparent plate 5 and a cover 6, and at the side of the chamber 2 is a print window 7 behind which a strip 8 of photoconductive material may be fed over rollers 9 and 11 as described in the aforesaid application. Mounted in the partition 3 is a projection lens 12 for projecting a record in window 4 to the print window 7, the projected light being reflected by a mirror 13.

According to this invention lamps 14, 15, 16 and 17 are mounted on brackets 18 in each of the four corners of the chamber 1 opposite the record window 4. Each of these lamps is preferably of the well-known projection type, having a concentrated filament 19 and a built-in reflector 21 for reflecting light away from the corner in which the lamp is mounted. In front of each lamp is a baffle 22 for preventing light from being reflected directly from the transparent plate 5 to the lens without first being reflected from one of the side walls 23, 24, 25 and 26 of chamber 1, which are made reflective in any suitable way, to the record window. The wall reflectors should be specular, that is, mirror-like surfaces, and not diffuse reflectors like painted surfaces. If shiny aluminum foil is used is should be stretched to lie flat. As shown in FIG. 1 the axis of the beam from each lamp is directed approximately parallel with the adjacent side wall, the axes of lamps 14 and 17 extending along wall 26 and the axes of lamps 15 and 16 extending along wall 24. Thus the axes of the beams from lamps 14 and 15 intersect wall 25 and the axes of the beams from lamps 16 and 17 intersect the wall 23. Owing to divergence each beam spreads over a considerable surface of the reflective sides so that the illumination of the record window is approximately uniform. For example, light from lamp 15 is reflected strongly from walls 24 and 25, less strongly from wall 26 and not at all from wall 23. By aiming the beams toward the corners of chamber 1 as aforesaid, the corners of the record window may be illuminated somewhat more than the central portion, the illumination gradually decreasing toward the center, thereby to compensate for usual lens deficiencies.

Each baffle comprises front and rear square plates 27 and 28. The rear plate 28 has an integral arm 29, the lower end of which is inserted under a clip 31 fast to a struck-up portion 32 of the partition 3. The front plate 27 is rotatably mounted on the back plate by a bolt 33 and is provided with dimples 34 in the corners to snap into openings 36 through the back plate to hold the front plate in any one of the four positions shown in FIGS. 4 to 7. The bolt 33 is located eccentrically of the front plate so that the lower edge of the front plate projects different distances below the lower edge of the back plate in each of its four positions, thereby to shield more or less of the reflective side walls of the chamber 1. With a light source of minimum intensity the baffle is adjusted to the position shown in FIG. 4, with a lamp of maximum intensity it is adjusted to the position shown in FIG. 7, and for intermediate intensities it is adjusted to the positions shown in FIGS. 6 and 7. Thus the light reflected to the record window may be maintained approximately constant notwithstanding variations in the intensities of the light sources as they are replaced from time to time.

It should be understood that the present disclosure is for the purpose of illustration only and that this invention includes all modifications and equivalents which fall within the scope of the appended claim.

I claim:

For printing a sheet of photographic material from a record sheet, a printer comprising a chamber having a record window to receive a record sheet, a print window to receive a sheet of photographic material, a lens between the two windows to focus the record sheet on the photographic sheet, said chamber and windows having corresponding rectangular shapes, means for illuminating the record sheet including light sources in said chamber opposite the record window, a reflector behind each light source, each reflector being directed toward an opposite side of said chamber adjacent the record window, sides of said chamber being reflective, a baffle in front of each light source to shield an area including said record window, each baffle comprising superposed parts and means to adjust one part relatively to the other part so that it projects more or less beyond an edge of the other part, the adjustable part being polygonal and eccentrically mounted on the other part so that, in different angular positions, different edges project different distances beyond said edge of the other part, and means to adjust the baffles to vary said areas.

References Cited by the Examiner

UNITED STATES PATENTS

| | | | |
|---|---|---|---|
| 2,081,329 | 5/1937 | Gordon | 88—24 |
| 2,338,901 | 1/1944 | Chiti | 240—41.3 |

FOREIGN PATENTS

| | | |
|---|---|---|
| 760,266 | 2/1934 | France. |

NORTON ANSHER, *Primary Examiner.*

R. A. WINTERCORN, *Assistant Examiner.*